US006970235B2

(12) United States Patent
Christophersen

(10) Patent No.: US 6,970,235 B2
(45) Date of Patent: Nov. 29, 2005

(54) DOCUMENT MONITORING METHOD

(75) Inventor: Bryan James Christophersen, Hampshire (GB)

(73) Assignee: De La Rue International Limited, Basingstoke (GB)

( * ) Notice: Subject to any disclaimer, the term of this patent is extended or adjusted under 35 U.S.C. 154(b) by 372 days.

(21) Appl. No.: 10/181,238

(22) PCT Filed: Jan. 23, 2001

(86) PCT No.: PCT/GB01/00254

§ 371 (c)(1),
(2), (4) Date: Aug. 14, 2002

(87) PCT Pub. No.: WO01/54076

PCT Pub. Date: Jul. 26, 2001

(65) Prior Publication Data

US 2003/0030785 A1 Feb. 13, 2003

(30) Foreign Application Priority Data

Jan. 24, 2000 (GB) .................................... 0001561

(51) Int. Cl.[7] ................................................ G01K 9/74
(52) U.S. Cl. ............................ 356/71; 356/72; 283/72; 283/91; 382/112
(58) Field of Search .................... 356/71, 444; 283/72, 283/85, 91–92; 382/112, 135, 137–138

(56) References Cited

U.S. PATENT DOCUMENTS

| | | | | |
|---|---|---|---|---|
| 3,679,314 | A | 7/1972 | Musteri | |
| 4,723,072 | A | 2/1988 | Naruse | |
| 4,875,589 | A * | 10/1989 | Lacey et al. | 382/137 |
| 5,498,879 | A | 3/1996 | De Man | |
| 6,040,584 | A * | 3/2000 | Liu et al. | 382/135 |
| 6,269,169 | B1 * | 7/2001 | Funk et al. | 283/72 |
| 6,661,910 | B2 * | 12/2003 | Jones et al. | 382/135 |

FOREIGN PATENT DOCUMENTS

| | | | |
|---|---|---|---|
| DE | 198 40 482 | A1 | 3/2000 |
| EP | 0 660 277 | A2 | 6/1995 |
| GB | 2 107 911 | A | 5/1983 |
| WO | WO 85/02928 | A1 | 7/1985 |
| WO | WO 99/09382 | A1 | 2/1999 |

* cited by examiner

*Primary Examiner*—Layla G. Lauchman
(74) *Attorney, Agent, or Firm*—Oliff & Berridge, PLC

(57) ABSTRACT

A method of inspecting documents of value, the method comprises: a) obtaining images of one or more parts of the document from radiation received from that part or those parts of the document (14) in respective different wavelength bands; b) performing an analysis of one of said images to identify a first type of class within which the document of value is included; and c) performing an analysis of another of said images using corresponding predetermined data relating to members of the first type of class identified in step b) so as to determine a second type of class within which the document of value is included.

27 Claims, 4 Drawing Sheets

DOCUMENT MONITORING METHOD

The invention relates to a method for monitoring documents, for example documents of value such as banknotes.

Document monitoring is used in a number of different fields to obtain information about different characteristics of documents, particularly documents being fed along a transport path. These characteristics include the document condition, size and, in the case of documents of value, characteristics such as authenticity and denomination. In order to determine these characteristics, different information must be obtained from the document and traditionally the document is fed past a number of is different detectors and processing environments to enable each aspect or characteristic to be determined. This is inefficient in terms of cost and space required and limits the extent of information which can be obtained.

Documents of value need to be inspected at least to determine their classification, for example their denomination and to confirm authenticity. One approach is to compare images of part or parts of the document under test obtained under predetermined illumination conditions with sets of predetermined images and determine which predetermined image most closely matches the image under test. However, the matching process is complex and thus can take a significant time while it is desirable to increase the speed of processing of documents of value, for example in banknote sorters and counters.

In accordance with the present invention, a method of inspecting documents of value comprises a) obtaining images of one or more parts of the document from radiation received from that part or those parts of the document in respective different wavelength bands;

b) performing an analysis of one of said images to identify a first type of class within which the document of value is included; and c) performing an analysis of another of said images using corresponding predetermined data relating to members of the first type of class identified in step b) so as to determine a second type of class within which the document of value is included.

In this invention, we provide a two stage inspection process. In particular, following the analysis in step b), the analysis of step c) is performed using only data relating to members of the first type of class identified in step b). In general, this will constitute a much smaller number of sets of data, typically just one, so speeding up the matching process.

The wavelength bands may be overlapping or non-overlapping, both in the visible or both in the non-visible spectra or, preferably, one in the visible and one in the non-visible e.g. infrared or ultraviolet.

Typically, the first type of class defines one or more of the denomination, face and orientation of the document of value. In this case, preferably the image used in step b) is obtained from visible radiation received from the document.

The second type of class may define the authenticity of the document of value. In this case, the image used in step c) may be defined by radiation received from the document in a waveband outside the visible wavelength range, for example the infrared wavelength range.

It should be understood, however, that these class types could be reversed so that initially an authenticity classification is carried out followed by a denomination or other classification.

As an alternative, the second type of class may define the degree of soiling of the document of value.

In a further, preferred case, the method further comprises d) performing an analysis of one of said images using corresponding predetermined data relating to members of the first type of class identified in step b) so as to determine a third type of class within which the document of value is included.

The second and third types of class can then be authenticity and degree of soiling respectively. Steps c) and d) could be carried out in parallel or sequentially and in one case, the predetermined data used in step d) could relate only to members of the second type of class identified in step c).

The images can be derived from different areas of the document since the discriminative and/or authenticating regions of the document may well be in different places. The data however is usually gathered at the same time.

The images can be obtained using conventional equipment such as described in EP-A-0660277, GB-A-2107911 and GB-A-1470737.

Preferably, however, step (a) is performed using a document monitoring system comprising illumination apparatus for illuminating a region, at which part of a document is located in use, with radiation in at least two different wavelength bands; and detection apparatus for detecting any of said radiation which is reflected by or transmitted through substantially the same said part of the document and for generating corresponding output signals.

This apparatus allows information to be obtained from a document by both reflection and transmission. By irradiating in at least two different wavelength bands, information relating to both authentication and classification can be achieved while reflected and transmitted radiation provides information about soiling and other conditions.

The illumination apparatus may generate the radiation at the at least two different wavelength bands simultaneously, the detection apparatus having separate detectors responsive to radiation in the different wavelength bands. Alternatively, the illumination apparatus may generate radiation in the different wavelength bands sequentially, the detection apparatus having one or more detectors responsive to radiation in all the wavelength bands.

In the preferred example, the illumination apparatus includes a radiation source located on the opposite side of the region to the detection apparatus for transmitting radiation through the document. However, as an alternative, the illumination apparatus may include a reflective surface in the said region and on which a document is located in use, wherein any radiation impinging on the reflective surface is reflected towards the detection apparatus.

In some cases, the system may include a single set of illumination apparatus and detection apparatus and the region may be chosen in accordance with the document to be monitored. Thus, the region could comprise a small region within the document or a region extending across the full dimension of the document. In the preferred case where the document is fed through the region, the region preferably extends across the full dimension of the document transverse to the feed direction.

In other cases, more than one set of detection and illumination apparatus may be provided to monitor different regions of the document.

The invention is particularly concerned with inspecting documents of value such as banknotes but is also applicable to visas, passports, licences, cheques, identity cards, plastic cards, bank notes, tickets, bonds, share certificates, vouchers, passes, permits, brand authentication labels, serial numbering slips, quality control certificates, bills of lading and other shipping documentation, legal documents and tamper evident labels and the like.

Some examples of methods and apparatus according to the invention will now be described with reference to the accompanying drawings, in which.

Figure 5:
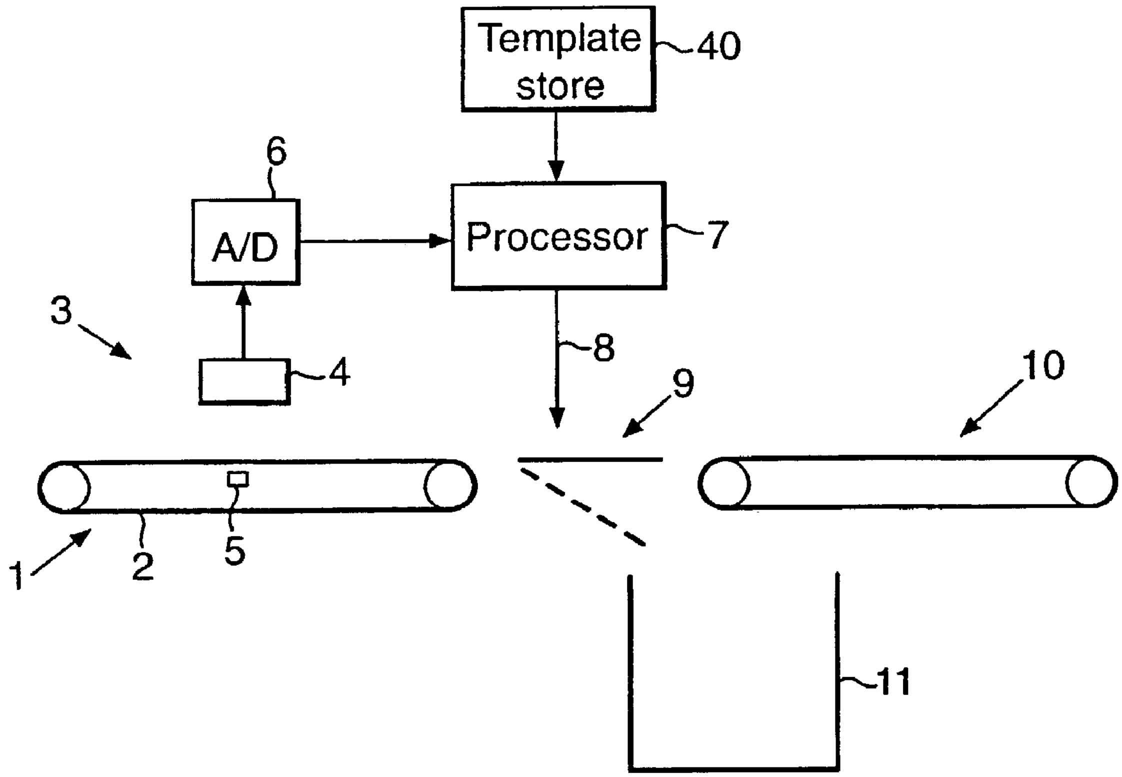

As mentioned above, the invention can be used in a wide variety of apparatus and in this particular example we will describe its application to banknote handling apparatus, for example a banknote sorter. In this sorter, the banknotes are fed from a stack (not shown) to a feed system 1 (FIG. 5) which, in this case, comprises a set of laterally spaced feed belts 2 (only one shown in FIG. 5) which feed the banknote into a detection system 3. The detection system 3 comprises a detector and illumination head 4 and a further illumination source 5, the output of the detector portion of the head 4 being fed to an analogue-to-digital convertor 6 coupled to a microprocessor 7. The microprocessor 7 operates on the incoming data as will be described below and generates, if appropriate, a control signal on a line 8 to operate a diverter 9 in the path of the banknote. The diverter 9 can be arranged as shown in solid lines in FIG. 5 so that the banknote passes to a downstream transport system 10 or, in the dashed line position, to allow banknotes to be fed to a store 11.

Figure 1A:
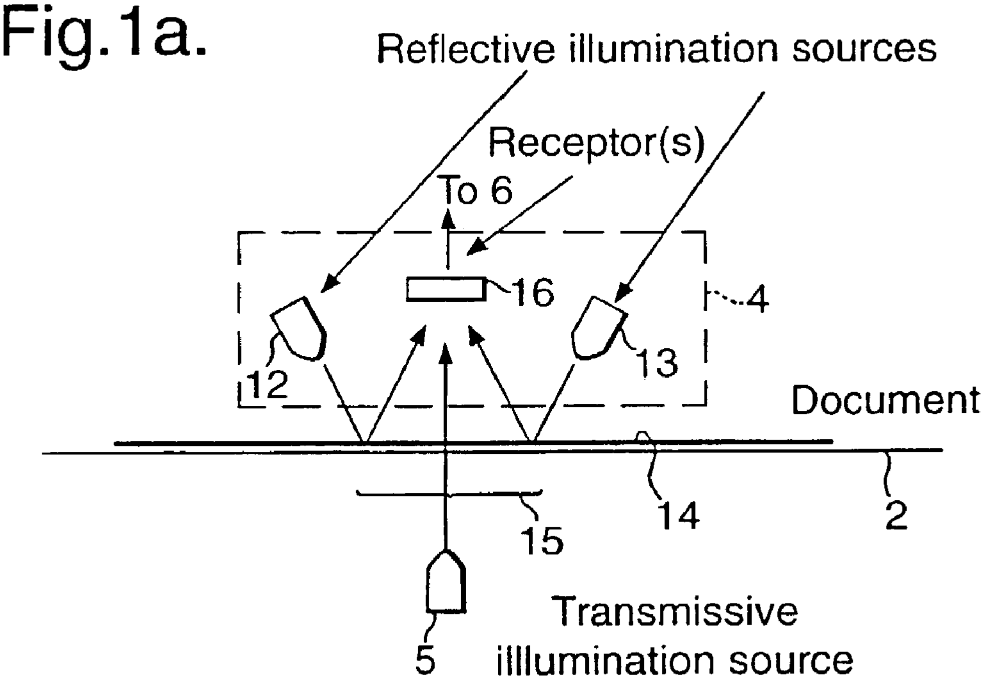
FIGS. 1A and 1B are schematic diagrams of two different examples of illumination and detection apparatus according to the invention.

FIG. 1A illustrates the detector and illumination head 4 in more detail. As can be seen, a pair of radiation sources 12,13 are provided, radiation from those sources impinging on a document 14 being fed by the belts 2. The radiation impinges on the document 14 within a region 15, all radiation reflected from within that region 15 being received by one or more detectors 16. In addition, as will be described below, the illumination source 5 generates a radiation beam which passes between the belts 2 and in the absence of the banknote 14 will be received by the detector 16.

Figure 1B:
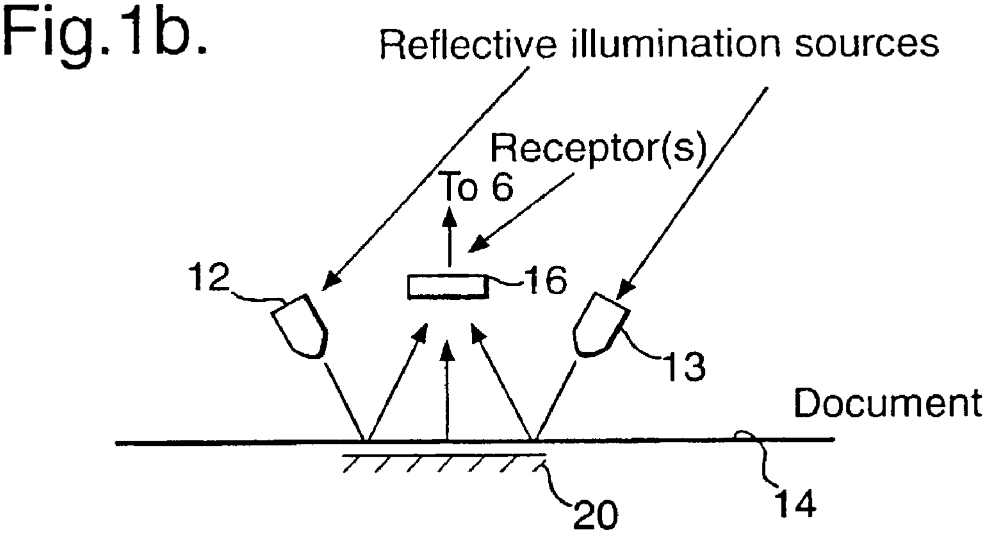

FIG. 1B illustrates a modified form of the apparatus shown in FIG. 1A in which the illumination source 5 is omitted and replaced by a reflector 20 having a high reflectivity. In the absence of a document 14, radiation from the sources 12,13 will be reflected by the reflector 20 onto the detector(s) 16. In addition, radiation passing through the document will be reflected back through the document to the detector(s) 16.

The sources 12,13 are arranged such that light will be reflected/scattered from the surface of the document 14 back to the detector(s) 16. No direct light path exists between the illumination sources and the detector(s). Dependant upon the choice of detector 16, the illumination sources 12,13 can either be broad band polychromatic devices, generating illumination from the IR and visible band (eg fluorescent tubes with appropriate coatings) or, can be collections of monochromatic sources (eg LEDs) that are modulated to provide pulses of light spread across the IR and visible spectra.

The detector(s) 16 could be a set of narrow band detectors for detecting radiation in respective wavebands, or a broadband receiver. In the latter case, the sources 12,13 will need to be modulated on and off to ensure that only one frequency or frequency band of light is illuminating the note at any one time. The modulation would be controlled from a processor or a piece of hardware that would successively turn on each illumination source whilst turning off each of the others.

The transmissive, visible radiation source 5 is positioned such that it is directly opposite the detector(s) 16. The transmissive source 5 can either be monochromatic or polychromatic to match the form of detector 16 but does not need to have any output in the IR.

The relative brightnesses of the sources 12,13 and the source 5 are arranged such that the image received by the detector(s) 16, when a document is present, is primarily created from the light reflected from the document, thus creating visible and IR reflective images of the document. The transmissive source 5 does not provide any substantial contribution to the received light when a document is present. However, when no document is present the transmissive source is set to be brighter than any reflected image.

Although two sources 12,13 are shown in FIGS. 1A and 1B, the invention is also applicable to one or more than two sources.

The detector(s) 16 shown in FIG. 1 receive the light from all three illumination sources 5,12,13 in all spectra. The detector(s) is chosen to match the form of illumination and can either be a single broadband device for use with modulated monochromatic sources, or a collection of narrow band devices responsive to selected spectra for use with polychromatic sources, the latter arrangement being achievable via the use of filters in front of the detectors. Typically the detectors will be photo-diodes or photo-transistors.

The use of polychromatic sources requires one detector for each point in the spectrum of interest e.g. red, green, blue and IR for colour and IR imaging, or visible and IR for grey scale and IR imaging.

The use of multiple modulated illumination sources 5,12, 13 allows the use of a single broadband detector as mentioned above.

The spectra in the example above is not meant to convey any limit to the range of usable spectra, the device can be constructed to work in any areas of the electromagnetic spectrum providing suitable illumination sources and receptors are available.

Before a document arrives at the detector system 3 (FIG. 1A) the transmissive source 5 will be illuminating the detector(s) 16 creating a constant bright image in the visible domain. The arrival of the document 14 will interrupt this beam creating a trigger indicating the arrival of its leading edge. Thereafter, with the document 14 present the detector(s) 16 will receive light from the reflective sources 12,13 until either a hole in the document occurs in front of the detector or the trailing edge arrives. Both events will lead to the light level at the detector rising back to the "no document" level.

Figure 2:
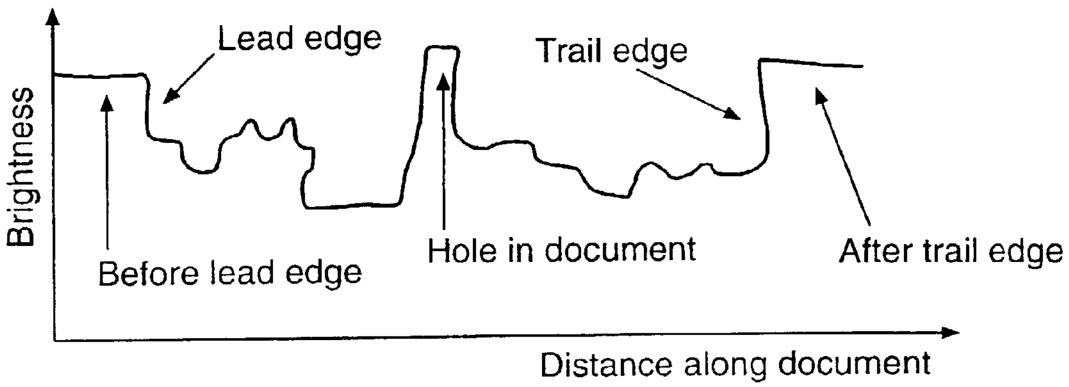
FIG. 2 illustrates an example of a signal received at a detector of the detection apparatus as a document moves past the detector.

FIG. 2 shows an illustration of the signal being received at a given receptor pixel as the document moves passed the detector.

Figure 3:
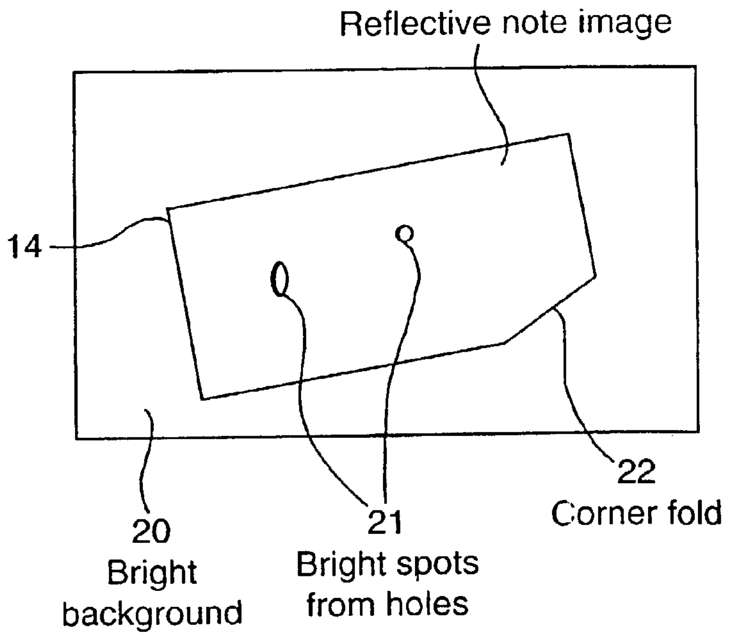
FIG. 3 illustrates an example of a banknote being fed beneath the detection apparatus.

The image thus created across all pixels of the detector is therefore one that has a very bright (or even saturated) background (from the transmissive illumination) within which is a reflective image of the document. The reflective image contains bright (or saturated) regions created by the transmissive illumination shining through any holes in the document. An illustration of this is shown in FIG. 3.

Further, it is important to realise that the detector head will be creating multiple images of each document, one for each illumination or reception spectra. The minimum for a gray scale and IR device will thus be two images and for a red, green, blue, IR device four images will be created. The number of images being equal to the number of points in the spectrum being used.

The or each detector element within the detector(s) 16 generates an analogue signal which is fed to the A/D convertor 6 for conversion into digital form, the digital signals then being fed to the microprocessor 7. The microprocessor 7 stores the digital signals in a conventional manner so as to define an image for each of the received wavebands.

Figure 4:
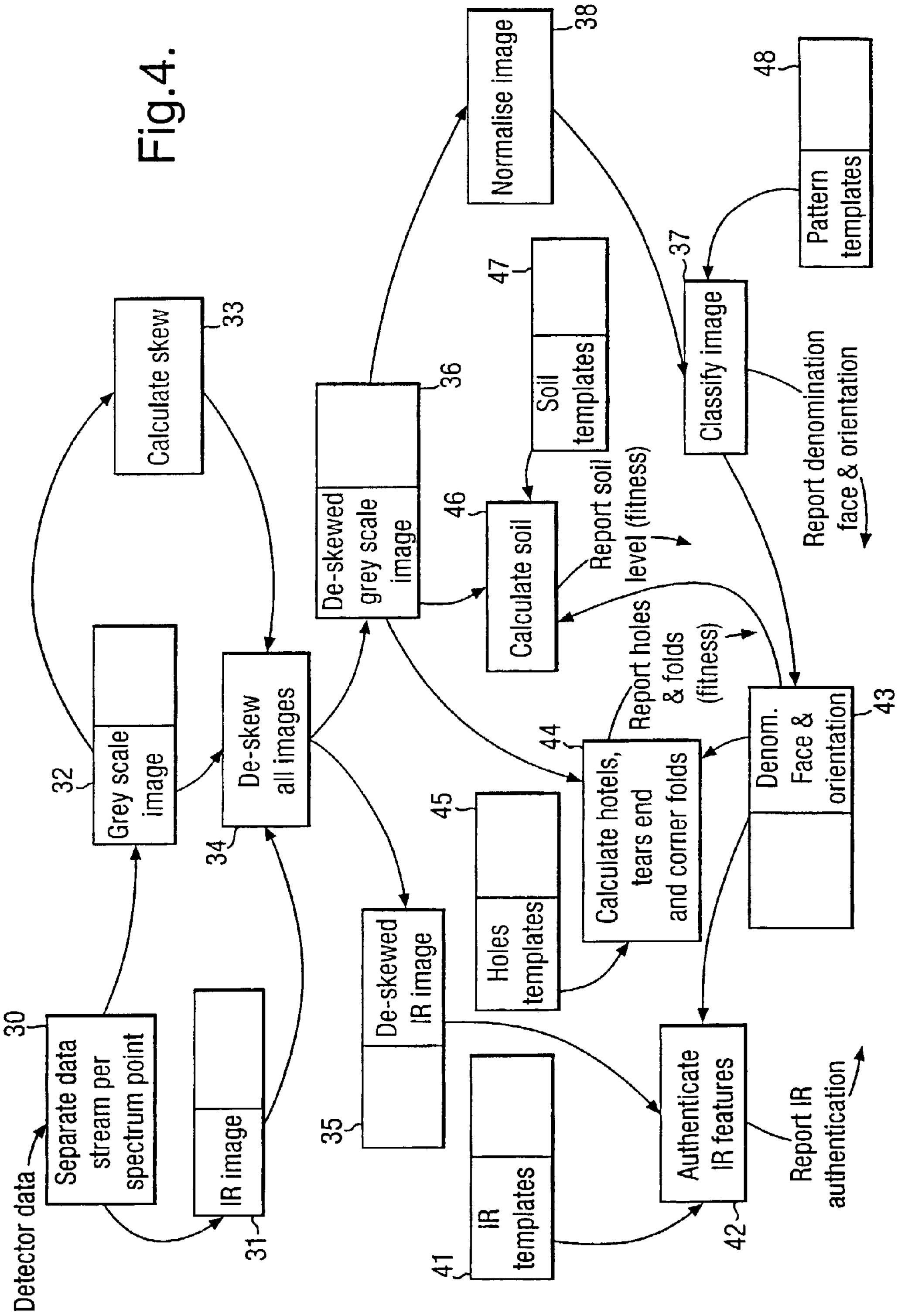
FIG. 4 is a flow diagram illustrating operation of the signal processing system; and, FIG. 5 is a schematic view of the banknote handling apparatus.

Each image created by the detector(s) 16 can be either separately processed or processed in conjunction with other images. A typical process sequence for a grey scale and IR device is shown in FIG. 4.

The incoming stream is the raw data arriving from the detector head and is initially segregated 30 to form images 31,32 for each point in the spectrum.

After this, visible image 32 is processed 33 in a conventional manner to determine the skew, this process also involving finding the edges of the document. The skew and positional information is then used 34 to de-skew and position all images such that they have a common coordination system with the templates that are used later in the processing 35,36.

The de-skewed visible image 36 is then processed 37 in order to determine its classification 43 by reference to predetermined templates 39 stored in a store 40. This comprises the denomination (the face value for a banknote) the face, (the top or bottom image) and the orientation (which way up the document is). A double sided document, such as a banknote, has one denomination, two faces and two orientations, a total of four classes. The determination of this is usually carried out on a normalised image 38 that has had the contrast varying effects of wear and print variations removed. The recognition means applied to the document, such as double threshold correlation using templates 48 are well known and will not be disussed here since the choice of algorithm will depend upon many factors such as image resolution and whether or not the image is from all or part of the document. A typical example is the technique used on the De La Rue 2700 Banknote Counter.

Once the document classification has been determined, this is then used to inform and reduce the processing requirements remaining. It should also be noted that whilst the processing up to this point has been of a serial nature the remaining processing can be carried out either serially or in parallel depending upon the choice of processing environment.

The authentication process 42 is carried out on the deskewed IR image 35 and is essentially a comparison between the acquired image and a single template 41 stored in the store 40, for the class 43 of document being examined. The single template 41 is the one indicated by the classification of the visible image. The use of the visible classification 43 to select the template 41 significantly reduces the processing required and allows features that may not distinguish two different classes to still be useful in the authentication decision. The simultaneous existence of the visible and IR images will also allow verification that a feature found in the IR domain for authentication also exists in the appropriate form in the visible domain. A version of this device that produces colour images may also be able to check the colour of the specific features. An example of an authenticatable feature is a portrait where the printing inks are arranged such that they appear to be a single colour when viewed in visible light but when viewed in the infra-red split into reflective and absorbing blocks.

The remaining processes 44 establish the condition (fitness) of the document and take place on the visible image 36. It should be noted that all of the processes for condition detection are performed on an image that has not been normalised.

The establishment of the transmissive illumination to be such that all holes 21 etc within the document become bright spots (brighter than the reflective image could ever reach) provides a means by which all such defects in the document can be determined using a suitable threshold. (See FIG. 2). Such information can be obtained by simple search through the image for data values that are as bright as the background. This process is again informed from the class 43 of the document since a template 45 is required to mask out transparent windows that may occur in some documents (e.g. Australian banknotes).

Similarly the use of edge tracing algorithms can be applied to the image to establish the position and size of any folds around the document edges. These algorithms establish the line equations for each portion of the document edge and then establish the intersection point of each line. The folds can be found by checking for orthogonality of the lines and by aligning the image within the appropriate rectangle for the document as informed by its class.

It is well known that as a document (especially a banknote) is handled the dirt build up tends to evenly cover it making the white areas less white and the dark areas less dark, in other words the overall contrast of the image is reduced. The level of dirt on the document (Soil level) is also determined from the visible image 36 and achieves this by a two pass process on the image. Again the process 46 is informed from the already established classification 43. The first pass is an overall comparison of the image with its template 48 for variations in the contrast of the image. This will give an overall measure and will also detect any large stains that may be present. The second pass uses the appropriate template 47 to just examine the unprinted areas of the document to determine its absolute brightness relative to its template. The template will have been developed from a mint note. The combination of these two measures will be used to report the overall soil level.

The templates 41,47,48 will typically be discriminant functions as used in the De La Rue 2700 Banknote Counter. The IR templates would be a binary image of the note face showing the areas containing the controlled IR features. The soil templates would be grey scale image of the note showing the contrast levels of a clean bank note. It would particularly illustrate areas of un-printed paper.

What is claimed is:

1. A method of inspecting documents of value, the method comprising moving a document past a document monitoring system, the document monitoring system:

a) obtaining images of one or more parts of the document from radiation received from that part or those parts of the document in respective different wavelength bands by using a document monitoring system comprising illumination apparatus for illuminating a region, at which part of the document is located in use, with radiation in at least two different wavelength bands; and detection apparatus for detecting any of said radiation which is reflected by or transmitted through substantially the same said part of the document and for generating corresponding output signals;

b) performing an analysis of one of said images to identify a first type of class within which the document is included; and c) performing an analysis of another of said images using corresponding predetermined data relating to members of the first type of class identified in step b) so as to determine a second type of class within which the document of value is included.

2. A method according to claim 1, wherein the illumination apparatus generates radiation in the different wavelength bands sequentially, the detection apparatus having one or more detectors responsive to radiation in all the wavelength bands.

3. A method according to claim 1, wherein the illumination apparatus comprises at least one radiation source located on the same side of the region as the detection apparatus.

4. A method according to claim 1, wherein the illumination apparatus includes a radiation source located on the opposite side of the region to the detection apparatus for transmitting radiation through the document.

5. A method according to claim 4, wherein the illumination apparatus comprises at least one radiation source located on the same side of the region as the detection apparatus, wherein the intensity of the radiation generated by the source on the opposite side of the region to the detection apparatus is greater than the intensity of the radiation generated by the other sources(s).

6. A method according to claim 1, wherein the detection apparatus comprises one or more photodiodes or phototransistors.

7. A method according to claim 1, wherein the illumination apparatus comprises one or more fluorescent tubes or light emitting diodes.

8. A method according to claim 1, wherein the wavelength bands define radiation in the visible and infrared regions respectively.

9. A method according to claim 1, further comprising more than one set of said illumination apparatus and detection apparatus, each set defining a respective region, wherein in use a document can be positioned so that respective parts of the document are located in each of the said regions.

10. A method of inspecting documents of value, the method comprising:

a) obtaining images of one or more parts of the document from radiation received from that part or those parts of the document in respective different wavelength bands;

b) performing an analysis of one of said images to identify a first type of class within which the document is included; and c) performing an analysis of another of said images using corresponding predetermined data relating to members of the first type of class identified in step b) so as to determine a second type of class within which the document of value is included, wherein step (a) is performed using a document monitoring system comprising illumination apparatus for illuminating a region, at which part of a document is located in use, with radiation in at least two different wavelength bands; and detection apparatus for detecting any of said radiation which is reflected by or transmitted through substantially the same said part of the document and for generating corresponding output signals, and the illumination apparatus includes a reflective surface in the said region and on which a document is located in use, wherein any radiation impinging on the reflective surface is reflected towards the detection apparatus.

11. A method of inspecting documents of value, the method comprising moving a document past a document monitoring system, the document monitoring system:

a) obtaining images of one or more parts of the document from radiation received from that part or those parts of the document in respective different wavelength bands;

b) performing an analysis of one of said images to identify a first type of class within which the document of value is included; and c) performing an analysis of another of said images using corresponding predetermined data relating to members of the first type of class identified in step b) so as to determine a second type of class within which the document of value is included, wherein a or at least one of the regions the document moves through extends across the full dimension of the document transverse to the feed direction.

12. A method of inspecting documents of value, the method comprising:

a) obtaining images of one or more parts of the document from radiation received from that part or those parts of the document in respective different wavelength bands;

b) performing an analysis of one of said images to identify a first type of class within which the document is included; and c) performing an analysis of another of said images using corresponding predetermined data relating to members of the first type of class identified in step b) so as to determine a second type of class within which the document of value is included, wherein step (a) is performed using a document monitoring system comprising illumination apparatus for illuminating a region, at which part of a document is located in use, with radiation in at least two different wavelength bands; and detection apparatus for detecting any of said radiation which is reflected by or transmitted through substantially the same said part of the document and for generating corresponding output signals, and the illumination apparatus the radiation at the at least two different wavelength bands simultaneously, the detection apparatus having separate detectors responsive to radiation in the different wavelength bands.

13. A method of inspecting documents of value, the method comprising moving a document past a document monitoring system, the document monitoring system:

a) obtaining images of one or more parts of the document from radiation received from that part or those parts of the document in respective different wavelength bands;

b) performing an analysis of one of said images to identify a first type of class within which the document of value is included; and c) performing an analysis of another of said images using corresponding predetermined data relating to members of the first type of class identified in step b) so as to determine a second type of class within which the document of value is included, wherein the image used in step c) is defined by radiation received from the document in a waveband outside the visible wavelength range, and the waveband outside the visible wavelength range is infrared wavelength range.

14. A method according to claim 1, wherein the document of value comprises a banknote.

15. A method according to claim 12, wherein the document of value comprises a banknote.

16. A method according to claim 10, wherein the document of value comprises a banknote.

17. A method according to claim 11, wherein the document of value comprises a banknote.

18. A method according to claim 13, wherein the document of value comprises a banknote.

19. A method according to claim 11, wherein the analyses of steps b) and c) comprise comparing the corresponding image with one or more predetermined images and selecting the predetermined image defining the best match.

20. A method according to claim 11, wherein the first type of class defines one or more of the denomination, face and orientation of the document of value.

21. A method according to claim 11, wherein the image used in step b) is obtained from visible radiation received from the document.

22. A method according to claim 11, wherein the second type of class defines the authenticity of the document value.

23. A method according to claim 11, wherein the image used in step c) is defined by radiation received from the document in a waveband outside the visible wavelength range.

24. A method according to claim 11, wherein the second type of class defines the degree of soiling of the document of value.

25. A method according to claim 11, further comprising:

d) performing an analysis of one of said images using corresponding predetermined data relating to members of the first type of class identified in step b) so as to determine a third type of class within which the document of value is included.

26. A method according to claim 25, wherein the third type of class defines one or more the degree of soiling, holes and tears of the document of value.

27. A method according to claim 24, wherein the image is obtained from radiation in the visible wavelength range.

* * * * *